May 19, 1959

H. P. PHILLIPS 2,887,180

CLOSURE FOR A LUBRICANT CONDUIT OF AN INTERNAL COMBUSTION ENGINE

Filed April 19, 1956

INVENTOR.
Harold P. Phillips
BY
Otto A. Earl
Attorney.

United States Patent Office 2,887,180
Patented May 19, 1959

2,887,180

CLOSURE FOR A LUBRICANT CONDUIT OF AN INTERNAL COMBUSTION ENGINE

Harold P. Phillips, Hastings, Mich., assignor to Hastings Manufacturing Company, Hastings, Mich., a corporation of Michigan Application April 19, 1956, Serial No. 579,182

2 Claims. (Cl. 184—6)

This invention relates to a closure for a lubricant conduit of an internal combustion engine, for example, a conduit for supplying lubricant to a tappet bearing.

The main objects of this invention are:

First, to provide a closure for a lubricant conduit of an internal combustion engine which closes and stops the flow of lubricant through such conduit.

Second, to provide a device for closing an oil conduit in an internal combustion engine which is simple in structure and may be easily installed to close one conduit without impeding the flow through a passage adapted to supply lubricant to such conduit.

Objects relating to details and economies of the invention will appear from the description to follow. The invention is defined and pointed out in the claims.

A preferred embodiment of the invention is illustrated in the accompanying drawing, in which.

Figure 1:
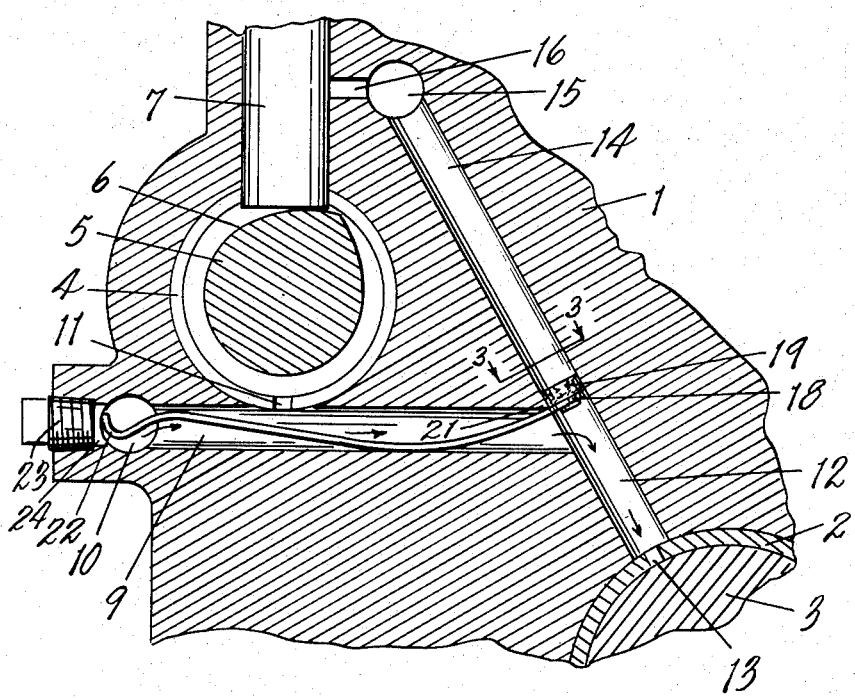
Fig. 1 is a fragmentary vertical section through the block of an internal combustion engine block illustrating certain operative parts thereof and lubricant passages or connections therefor.
Figure 2:
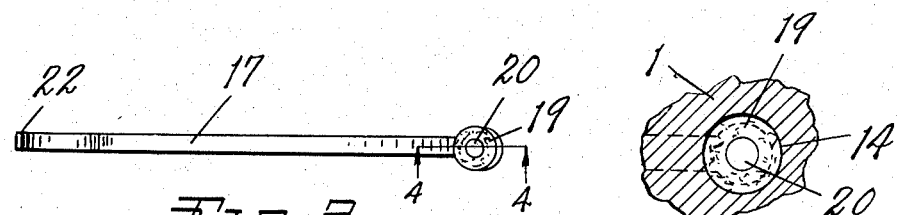
Fig. 2 is a top view of the passage closing device of my invention.
Figure 3:
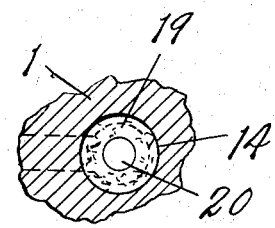
Fig. 3 is an enlarged fragmentary view in section on a line corresponding to line 3—3 of Fig. 1.
Figure 4:
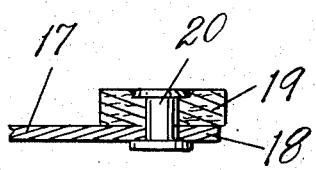
Fig. 4 is an enlarged fragmentary view on a line corresponding to line 4—4 of Fig. 2.

In certain types of internal combustion engines conduits are provided for supplying lubricant to the valve tappets. In other types, and perhaps more generally used types, there are no conduits for supplying lubricant to the tappets. In the type in which there are conduits for conveying or supplying lubricant to the tappets an excessive and wasteful amount of lubricant is used particularly after the parts become somewhat worn and it is the primary object of my invention to provide a closure for closing the conduit to the tappet bearings.

In the accompanying drawing 1 represents an engine block provided with a bearing 2 for the crankshaft 3 with a bearing 4 for the camshaft 5. The camshaft 5 has cams 6 thereon coacting with the tappets 7 which reciprocate in bearings 8 in the engine block.

The conduit 9 is connected to a pump (not illustrated) through the conduit 10, the bearing 4 has an opening 11 thereon opening to the conduit 9. The conduit 9 has a branch 12 supplying lubricant to the crankshaft bearing through the opening 13.

The engine block has an oil conduit 14 opening to the conduit 9 at an angle thereto and connected to the header or gallery 15 which is connected through passages 16 to the bearings for the tappets 7. These parts are shown conventionally and are in general such as are present in the type of engines in which a direct supply of lubricant is provided for the tappets, that is, direct in the sense that open passages are provided instead of reliance upon lubrication through vaporized oil or airborne oil as in the second type of engines referred to.

As I have pointed out in the type of engines in which a direct lubricant conduit is provided the tappets use an unnecessary amount of lubricant. I therefore provide means for closing the lubricant passage for the tappets. This means or device comprises the elongated bowed springable support member formed of springable stock, desirably of flat cross section, and adapted to be inserted longitudinally in the lubricant conduit 9 in engagement with opposite sides of the walls thereof under sprung tension.

The member 17 is provided with a disc-like head 18 at its inner end to which is secured the closure disc 19 preferably by means of the rivet 20 arranged centrally through the head 18 and the closure disc 19 which is of substantially rigid but slightly yielding material and is of such diameter as to sealingly fit within the conduit 14 which is disposed at an angle to the conduit 9. When in this position the support member engages the edge 21 formed by the juncture of the conduits and the bowed portion of the support engages the opposed wall of the conduit 9. The support member is provided with a hook portion 22 which serves as a handle for inserting or removing the device from the engine block.

The device is inserted merely by pushing into the conduit 9 until the closure member snaps into the conduit 14 to close the same. The passage 9 is provided with a closure plug 23 for the opening 24 through which the closure device may be inserted. After the device is once inserted it is not ordinarily necessary to remove it but should that be required it can be pulled out although that is likely to injure or distort the closure disc so that the closure cannot again be used. When inserted the closure device is effectively supported to close the conduit 14; at the same time it does not objectionably restrict the conduit 9 in which the support member is positioned.

The relative diameter of the closure disc and of the support head is such that the closure disc projects beyond the periphery of the head of the support member and it is located entirely at one side of the support member so that it can effectively seal or close the passage 14. It also serves to anchor the support member against longitudinal movement or displacement.

I have illustrated and described my invention in an embodiment adapted for a type of engine which is in commercial use and it is believed that this disclosure will enable those skilled in the art to embody or adapt my invention to meet particular requirements.

Having thus described the invention, what is claimed to be new and is desired to secure by Letters Patent is:

1. In combination with an internal combustion engine including a block, a cam shaft and bearing therefor, a tappet operatively associated with said cam shaft, a first lubricant supply conduit in communication with the bearing of said cam shaft, and a second lubricant supply conduit for supplying lubricant to said tappet opening to said first lubricant conduit at an angle thereto, of means for closing said second conduit at the juncture thereof with said first conduit comprising a springable, elongated, bowed, support member of flat cross section disposed longitudinally in said first conduit under spring stress and having a disc like head at its inner end, a closure disc disposed upon and fixedly secured to said head by a rivet arranged centrally through the head and the disc with a closure disc projecting peripherally beyond the peripheral edges of the head, said closure disc being of slightly yielding material and being in fitting engagement with the wall of the second conduit at the juncture thereof with said first conduit, said support member being disposed in said first conduit with end and intermediate flat side portions thereof in spring biased thrust engagement with opposed walls of the conduit, said closure disc when said support member is so positioned acting to prevent longitudinal movement of the support member in said first conduit.

2. In combination with an internal combustion engine including a block, a cam shaft and bearing therefor, a tappet operatively associated with said cam shaft, a first lubricant supply conduit in communication with the bearing of said cam shaft, and a second lubricant supply conduit for supplying lubricant to said tappet opening to said first lubricant conduit at an angle thereto, of means for closing said second conduit at the juncture thereof with said first conduit comprising a springable, elongated, bowed, support member disposed longitudinally in said first conduit under spring stress, a closure disc fixedly secured to the inner end of said support member, said closure disc being of slightly yielding material and being in fitting engagement with the wall of the second conduit at the juncture thereof with said first conduit, said support member being disposed in said first conduit with end and intermediate flat side portions thereof in spring biased thrust engagement with opposed walls of the conduit, said closure disc when said support member is so positioned acting to prevent longitudinal movement of the support member in said first conduit.

References Cited in the file of this patent
UNITED STATES PATENTS

| | | |
|---|---|---|
| 2,157,218 | Ross | May 9, 1939 |
| 2,202,074 | Worel | May 28, 1940 |
| 2,729,306 | Davis | Jan. 3, 1956 |